McNulty & Kern,

Tanning Apparatus,

No. 2,519. Reissued Mar. 19, 1867.

Witnesses:

C. D. Smith

Inventor:
B. H. McNulty
Wm. Kern
By Munn & Co
Attorneys.

N. PETERS, PHOTO-LITHOGRAPHER, WASHINGTON, D. C.

United States Patent Office.

B. H. McNULTY, OF PHILADELPHIA, PENNSYLVANIA, WILLIAM KERN, OF MANSFIELD, OHIO, AND STERLING BONSALL, OF PHILADELPHIA, PENNSYLVANIA, ASSIGNEE. of one Third Interest

*Letters Patent No.* 47,844, *dated May* 23, 1865; *reissue No.* 2,519, *dated March* 19, 1867.

IMPROVEMENT IN APPARATUS FOR TANNING.

The Schedule referred to in these Letters Patent and making part of the same.

TO ALL WHOM IT MAY CONCERN:

Be it known that the undersigned, B. H. McNULTY, late of Mansfield, Richland county, Ohio, but now of Philadelphia, Pennsylvania, and WILLIAM KERN, of Mansfield, Richland county, Ohio, aforesaid, did invent a new and improved Process for Tanning, and did obtain Letters Patent of the United States therefor, bearing date the twenty-third day of May, 1865, and did afterwards transfer and assign to the undersigned, STERLING BONSALL, of the city of Philadelphia, and State of Pennsylvania, one undivided third part of all their right, title, and interest in and to said Letters Patent; and we do hereby declare the following to be a full and exact description of the said invention, reference being had to the accompanying drawings, which form part of this specification, and in which—

Similar letters of reference indicate like parts in the several figures.

This invention relates to an improved method of tanning leather, and consists, first, in hanging the hides in the tanning liquor, and agitating the liquor by means of a revolving or other movable dasher located in the lower portion of the vat; and, second, in agitating the liquor by the means aforesaid while the same is under pressure, as hereinafter described.

When the hides are hung in the vat, so that the tanning liquor may freely permeate between them, it is manifest that a violent agitation of the liquor by means of a movable dasher in the lower part of the vat will draw down the spent liquor from the top, and throw up the stronger liquor from the bottom, and thus maintain an equilibrium of the strength of the liquor in all parts of the vat, and tend continually to bring new particles of the tanning matter in contact with the surfaces of the hides to be absorbed by the pores thereof. And, if while the tanning liquor is thus being agitated, pressure be applied to the liquor in the vat, it is manifest that the tanning matter will be more rapidly forced into the pores of the hides, and the tanning process will be thereby accelerated without detriment to the leather.

To enable others skilled in the art to which this invention appertains to understand and use the same, we will proceed to describe the manner of carrying it into effect.

Figure 1:
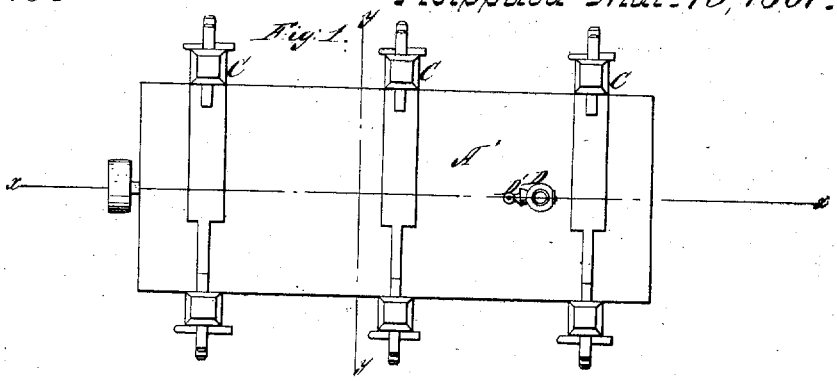
Figure 1 is a plan of the apparatus employed in carrying our invention into effect.
Figure 2:
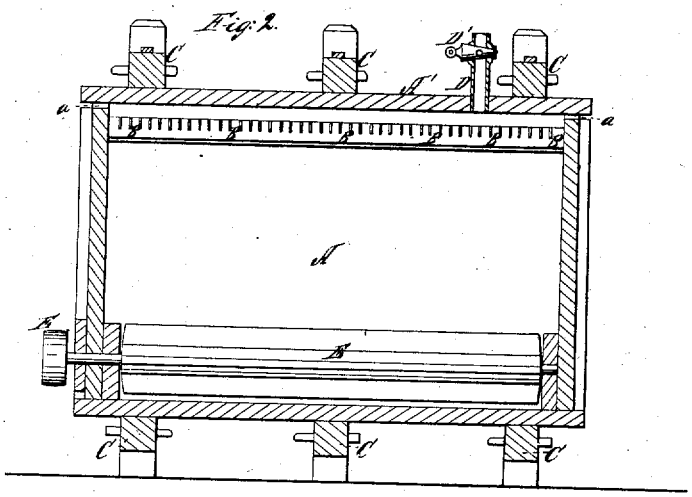
Figure 2 is a vertical, longitudinal, and central section of the same, the line *x x* denoting the plane of section.
Figure 3:
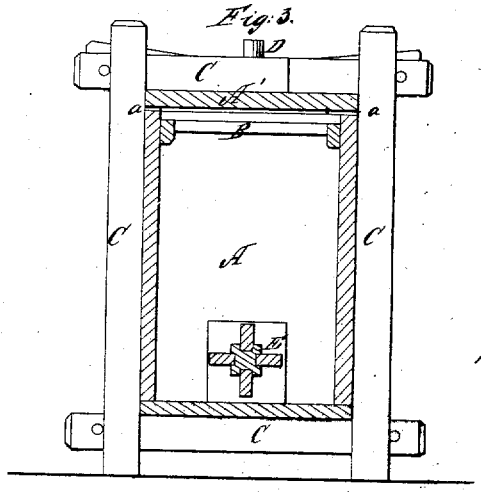
Figure 3 is a vertical transverse section in the line *y y*, fig. 1.

In the accompanying drawings, A represents a vat, and A′ a lid therefor, a tight joint being made between the lid and vat by an elastic packing, *a a*, which prevents the escape of water from the interior of the vat during the tanning process. The hides are hung upon the supports or bars B, and after this has been done the lid A′ is placed in position on the vat and secured by the braces or retainers C, which being connected together by pins and wedges so as to form frames, may be readily applied and removed. E is a dasher, shown in fig. 2, turned by a band placed around the pulley E′ on the outside of the vat; this joint is secured by a packing or stuffing-box arrangement, through which the axle passes. D is a pipe or nozzle inserted into and passing through the lid A′, and provided with a cock, D′. The hose of a force-pump may be attached to the nozzle D, and after the tanning liquid has been forcibly injected into the vat until the requisite degree of pressure is attained, such pressure is sustained by turning the cock D′. Leather of a superior quality may be produced by thus retaining the liquid within the vat under pressure, but it is manifest that in the motionless condition of the liquid the tanning substance in the immediate vicinity of the leather is absorbed, while the portion of the liquid more remote from the hide remains charged. To keep the liquid in circulation and the tanning substance thereof in contact with the surface of the hide, we employ a dasher, E, which, through the medium of a pulley, E′, may be rotated so as to keep fresh portions of the liquid, or that which contains the tanning substance, constantly in contact with the hides; and this agitation being performed while the liquid is under pressure, insures the rapid and complete impregnation of the hide by the tannin. The dasher or agitator E is located in the bottom of the vat A, and the power whereby it is rotated can be derived from a steam engine or any other suitable source. A man-hole should be provided in the lid of the vat, through which the liquor may be put in the vat and the hides inspected.

We operate as follows: Having limed and bated or sweated the hides in the usual manner, we suspend them across the vat on the bars B B, fill the vat with liquor, put on the lid A′, wedge it down, then attach a hose to pipe D, and with a small force-pump placed in a bucket of liquor we force in such an extra amount of liquor as will put on what pressure we require, say from five to twenty pounds to the square inch; we then turn the stop-cock D′, and shut in or retain this pressure. One force-pump does for all the vats. Motion is then given to the dasher E by the pulley, and this is kept up either all day, or day and night, as the yard may be running either by steam or water power. The lid is not taken off until the hides are tanned. When the pressure is put on, as the liquor cannot be compressed and cannot enter the pores of the wood, it must enter the pores of the hides, carrying the tannic acid to the centre before the chemical change can take place on the outside, making almost a uniformity of action; the outside cannot become overtanned and brittle, the fibre is perfectly preserved, and will be found long and with a life in it rather than short and comparatively dried up or rotten, as chemicals will make it. As the chemical change or action of tannic acid on gelatin is almost instantaneous, it follows that it is only necessary to bring them together to accomplish the tanning of the hide; but as too great strength of acid or liquor is not desirable, we put on the weak liquors at first and gradually increase the strength of the liquor and the pressure used. By this means we gradually change the gelatin, expand the pores, and fill them thoroughly. The dasher E being in motion draws down the spent liquor from the top, throws up the stronger liquors from the bottom, and keeps up a constant agitation from end to end, and in fact in all parts of the vat; this keeps a uniform strength of liquor to all parts of the hides and makes a more even grain. The dasher or agitator may be used with good effect without pressure, but we prefer to agitate the liquor when under pressure as above described.

Having thus fully described the invention of the said B. H. McNulty and William Kern, and the several modes of carrying it into effect, what we claim as their invention, and desire to secure by Letters Patent, is—

1. Hanging the hides in a vat, and agitating the tanning liquor by means of a rotary dasher or agitator, substantially as and for the purpose described.

2. Hanging the hides in a close, water-tight vat, and agitating the tanning liquor by means of a rotary or otherwise moving dasher, while the liquor is under pressure within said closed vat, substantially as described.

3. We claim the combination of the water-tight vat A, the dasher E, and a force-pump, or other equivalent means of producing pressure within the vat, substantially as described.

4. We also claim the dasher E located in the lower part of the vat, in combination with the bars B, or other equivalent means for hanging the hides in the vat, so that the tanning liquor when agitated by the dasher will freely permeate between the hides, substantially as described.

B. H. McNULTY,
STERLING BONSALL,
WM. KERN.

Witnesses for McNulty and Bonsall:
James S. Phillips,
Lisle Stokes.
Witnesses for William Kern:
Henry C. Hedges,
Geo. A. Clugston.